(12) United States Patent
Yang et al.

(10) Patent No.: US 8,850,156 B2
(45) Date of Patent: Sep. 30, 2014

(54) METHOD AND SYSTEM FOR MANAGING VIRTUAL MACHINE STORAGE SPACE AND PHYSICAL HOST

(75) Inventors: Xiaowei Yang, Hangzhou (CN); Zhikun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 13/339,209

(22) Filed: Dec. 28, 2011

(65) Prior Publication Data

US 2012/0110293 A1   May 3, 2012

Related U.S. Application Data

(63) Continuation of application No. PCT/CN2011/074025, filed on May 13, 2011.

(30) Foreign Application Priority Data

Nov. 3, 2010   (CN) .......................... 2010 1 0530638

(51) Int. Cl.
  *G06F 12/08*   (2006.01)
  *G06F 9/455*   (2006.01)
  *G06F 9/445*   (2006.01)
(52) U.S. Cl.
  CPC ............ *G06F 9/45558* (2013.01); *G06F 9/445* (2013.01); *G06F 2009/45579* (2013.01)
  USPC ............................ 711/170; 711/171; 711/172
(58) Field of Classification Search
  None
  See application file for complete search history.

(56) References Cited

U.S. PATENT DOCUMENTS

| 7,433,951 | B1 | 10/2008 | Waldspurger |
| 2002/0133539 | A1* | 9/2002 | Monday ........................ 709/203 |
| 2008/0270674 | A1 | 10/2008 | Ginzton |
| 2009/0070776 | A1 | 3/2009 | Dahlstedt |
| 2010/0023941 | A1 | 1/2010 | Iwamatsu et al. |
| 2011/0138147 | A1* | 6/2011 | Knowles et al. ............... 711/170 |

FOREIGN PATENT DOCUMENTS

| CN | 101477495 A | 7/2009 |
| CN | 101587524 A | 11/2009 |

(Continued)

OTHER PUBLICATIONS

English-language translation of International Search Report from the Chinese Patent Office for International Application No. PCT/CN2011/074025 mailed Aug. 25, 2011.

(Continued)

*Primary Examiner* — Matthew Bradley
*Assistant Examiner* — Candice Rankin

(57) ABSTRACT

A method for managing Virtual Machine (VM) storage space is provided. In the method, a Storage Balloon Agent (SBA) module deployed in a VM is adopted to directly acquire virtual storage free block information and deliver the acquired virtual storage free block information to a Storage Balloon Daemon (SBD) module deployed in a Virtual Machine Monitor (VMM) layer; and the SBD module releases a part or all of physical storage space corresponding to the virtual storage free block information, and marks virtual storage blocks corresponding to the released physical storage space as unavailable. A corresponding system and a physical host are further provided in the present invention. Through the method of an embodiment of the present invention, use condition of virtual storage space can be acquired in real time, and a large number of read and write operations of a storage system can be avoided.

12 Claims, 6 Drawing Sheets

(56) References Cited

FOREIGN PATENT DOCUMENTS

| | | |
|---|---|---|
| CN | 101751335 A | 6/2010 |
| CN | 101986285 A | 3/2011 |
| JP | 2000155713 A | 6/2000 |
| JP | 2005011208 A | 1/2005 |
| JP | 2006293543 A | 10/2006 |
| JP | 2008234268 A | 10/2008 |

OTHER PUBLICATIONS

EPO Extended Search Report mailed Jul. 10, 2012, issued in related European Application No. 11779077.4, Huawei Technologies Co., Ltd. (7 pages).

* cited by examiner

METHOD AND SYSTEM FOR MANAGING VIRTUAL MACHINE STORAGE SPACE AND PHYSICAL HOST

CROSS-REFERENCE TO RELATED APPLICATIONS

This application is a continuation of International Application No. PCT/CN2011/074025, filed on May 13, 2011, which claims priority to Chinese Patent Application No. 201010530638.8, filed on Nov. 3, 2010, both of which are hereby incorporated by reference in their entireties.

FIELD OF THE INVENTION

The present invention relates to the field of computer virtualization technologies, and in particular, to a method and a system for managing Virtual Machine (VM) storage space and a physical host.

BACKGROUND OF THE INVENTION

A computer virtualization technology is a decoupling method for separating a lower-layer hardware device from an upper-layer operating system and application of a computer. The computer virtualization technology introduces a Virtual Machine Monitor (VMM) layer to directly manage lower-layer hardware resources and create a VM unrelated to lower-layer hardware for the upper-layer operating system and the application to use. A corresponding VM architecture is shown in FIG. 1. As one of important lower-layer support technologies for a currently popular cloud computing platform, the virtualization technology can greatly increase resource use efficiency of a physical device. Compared with a conventional physical machine, the VM has better isolation and encapsulation characteristics. Information of the whole VM can be saved in a Virtual Disk Image (VDI), so as to conveniently perform operations such as snapshot taking, backing up, cloning, and distribution on the VM.

A Virtual Disk (VDisk) is a virtual storage device provided by the VMM for the VM to use. Physical storage space corresponding to the VDisk may be a local storage system of a host or a network storage system of a data center, such as, a Network Attached Storage (NAS) file server, a Storage Area Network (SAN), a storage cluster, or a storage cloud. The VDisk may exist in the host in the form of a file or a block device (such as a disk partition or a logical volume).

VM storage space is generally allocated in the following two manners: pre-allocation and dynamic allocation. In the pre-allocation, storage space having a designated size is allocated to each VM at a time. When VM data is less, the pre-allocation generates a large space waste. The dynamic allocation of virtual storage space may reduce a storage resource waste to a certain extent. At the beginning, the virtual storage space occupies small actual storage space. With the use of a user, more and more files are created in the VM storage space, and larger and larger storage space is occupied.

Although the existing method for managing the storage space through the dynamic allocation can perform the allocation according to requirements, when a file deletion operation is performed in the VM, if the host cannot perceive the operation, the host cannot release free space that is already released by the VM. For example, a VM having a 20 GB virtual storage device basically uses up all the storage space as temporary files during a busiest task. When the task is idle, the temporary files are deleted, and 15 GB free space exists in the system, but storage resources of the host occupied by the 15 GB free space are not released.

In the prior art, virtual computer software VM ware Workstation provides a VM ware Shrinking Virtual Disk function, which can release free data blocks (hereinafter, blocks) in a VM Ware Virtual Machine Disk Format (VMDK) dynamic VDisk. The main steps are as follows.

Perform disk defragmentation in the VM (optional).

Set free blocks in the VDisk to zero through VM Tools in the VM.

A supporting tool in the host scans a file or a block device corresponding to the VDisk to identify the "zero" blocks, and perform image shrinking by using dynamic image format characteristics to complete release of the free data blocks.

In the foregoing method, in the process in which the VM Tools sets the free blocks in the VDisk to zero, a write operation needs to be performed on all the free blocks, and when the host identifies the "zero" blocks, a read operation needs to be performed on all the data blocks. That is, in the existing method, high operation overhead exists, and too many disk read and write operations waste a large amount of disk bandwidth and spend a long time. Moreover, in the existing method, the host indirectly judges space occupation of each data block in the VDisk by identifying the "zero" blocks, so global free data block information of a disk of the VM cannot be acquired in real time. Moreover, application of the existing method is limited, and the method is only applicable to the dynamic allocation image format. For a pre-allocation mirror format, the free blocks cannot be released.

SUMMARY OF THE INVENTION

Embodiments of the present invention provide a method for managing VM storage space and a physical host, so as to effectively manage the storage space and increase a utilization ratio of a storage system.

A method for managing VM storage space is provided, which is applicable to a physical host, in which the physical host includes a hardware layer, a VMM layer running on the hardware layer, and a VM running on the VMM layer, a Storage Balloon Agent (SBA) module is deployed in the VM, and a Storage Balloon Daemon (SBD) module is deployed in the VMM layer, where the method includes:

acquiring, by the SBA module, a part of occupied virtual storage blocks according to a size of virtual storage space occupied by a predefined file, and delivering virtual storage free block information corresponding to the virtual storage blocks to the SBD module; and releasing, by the SBD module, a part or all of physical storage space corresponding to the virtual storage free block information, and marking virtual storage blocks corresponding to the released physical storage space as unavailable.

A system for managing VM storage space is provided, which includes an SBA module deployed in a VM and an SBD module deployed in a VMM layer, where the SBA module is configured to acquire a part of occupied virtual storage blocks according to a size of virtual storage space occupied by a predefined file, and deliver virtual storage free block information corresponding to the virtual storage blocks to the SBD module; and the SBD module is configured to release a part or all of physical storage space corresponding to the virtual storage free block information, and mark virtual storage blocks corresponding to the released physical storage space as unavailable.

A physical host is provided, which includes a hardware layer, a VMM layer running on the hardware layer, and at least one VM running on the VMM layer, in which an SBA module is deployed in the VM, and an SBD module is deployed in the VMM layer, where the SBA module is configured to acquire a part of occupied virtual storage blocks according to a size of virtual storage space occupied by a predefined file, and deliver virtual storage free block information corresponding to the part of the virtual storage blocks to the SBD module; and the SBD module is configured to release a part or all of physical storage space corresponding to the virtual storage free block information, and mark virtual storage blocks corresponding to the released physical storage space as unavailable.

The embodiments of the present invention adopt the following technical solutions: The SBA module is deployed in the VM, and the SBD module is deployed in the VMM layer. The SBA module acquires the virtual storage free block information according to the occupation of the virtual storage space occupied by the predefined file, and delivers the virtual storage free block information to the SBD module; the SBD module releases the physical storage space corresponding to the virtual storage free block information. Through the technical solutions, in one aspect, the virtual storage free block information can be acquired in real time, so the real time characteristic is good; in another aspect, a large number of read and write operations of the storage system are avoided, so the system overhead is low. Moreover, in the method, an interface of a file system is used to acquire the virtual storage free block information, so that implementation details of the file system do not need to be learned, and the universality is good. The method is applicable to both a dynamic allocation image format and a pre-allocation mirror format.

DETAILED DESCRIPTION OF THE EMBODIMENTS

An embodiment of the present invention provides a method for managing VM storage space, applied to a physical host. The physical host includes a hardware layer, a VMM layer running on the hardware layer, and a VM running on the VMM layer, where an SBA module is deployed in the VM, and an SBD module is deployed in the VMM layer. In the method, the SBA deployed in the VM directly obtains virtual storage free block information and delivers the obtained virtual storage free block information to the SBD that is in the VMM layer and cooperate with the SBA, and the SBD marks and releases physical storage space corresponding to the virtual storage free block information in a VM storage format. An embodiment of the present invention further provides a corresponding system for managing VM storage space and a physical host. Details will be described in the following.

Figures 1, 2:
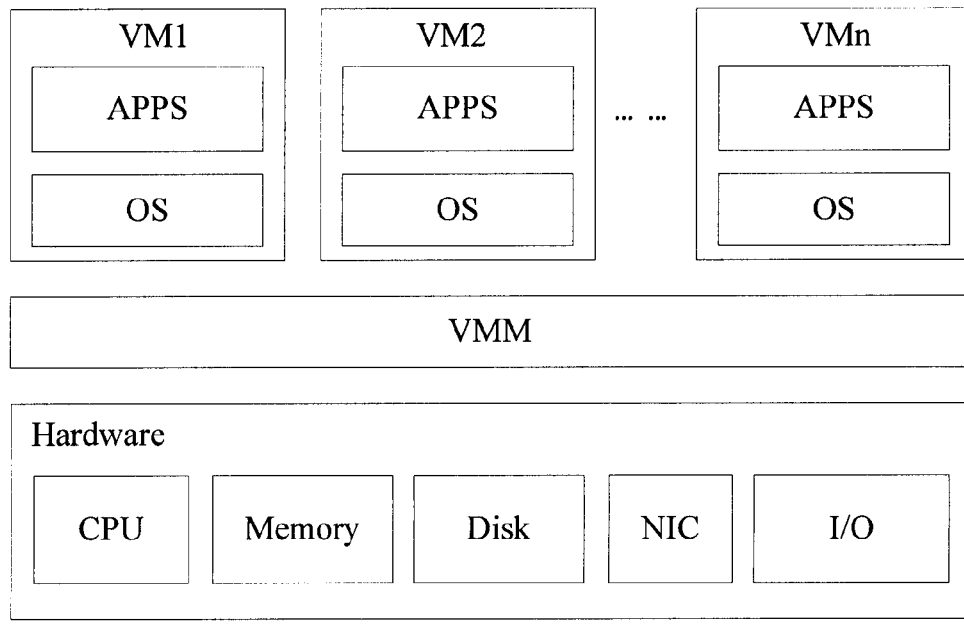
FIG. 1 is a schematic diagram of a VM architecture.
FIG. 2 is a schematic flow chart of a method for managing VM storage space according to an embodiment of the present invention.

FIG. 2 shows a method for managing VM storage space according to an embodiment of the present invention. The method is applicable to a physical host. The physical host includes a hardware layer, a VMM layer running on the hardware layer, and a VM running on the VMM layer, where an SBA module is deployed in the VM, and an SBD module is deployed in the VMM layer. The method may include the following steps.

100: The SBA module acquires a part of occupied virtual storage blocks according to a size of virtual storage space occupied by a predefined file, and delivers virtual storage free block information corresponding to the virtual storage blocks to the SBD module.

In this step, the SBA deployed in the VM can directly acquire the virtual storage free block information according to the occupation of the virtual storage space occupied by the predefined file, so a write operation of zero setting does not need to be performed on each free block.

Moreover, in an implementation manner, the SBA module may deliver the virtual storage free block information corresponding to the virtual storage blocks to the SBD module deployed in the VMM layer by sharing a memory, so a read operation does not need to be performed on each free block.

The predefined file may be a predefined file of any type, which functions to occupy certain virtual storage free space. For example, for drive C of the VM Windows Operation System, the predefined file may be C:\balloon.sys. The embodiment of the present invention may use an existing file as a predefined file or create a new file as a predefined file.

200: The SBD module releases a part or all of physical storage space corresponding to the virtual storage free block information, and marks virtual storage blocks corresponding to the released physical storage space as unavailable.

In this step, the SBD performs an operation of releasing a free block. In an implementation manner, according to a preset policy, the SBD releases the physical storage space corresponding to a part or all of the virtual storage blocks marked as free, and marks the virtual storage blocks corresponding to the released physical storage space as unavailable.

When a storage system of the physical host is a disk, the predefined file occupies VDisk space, and the released and marked physical storage space is specifically physical disk space.

Figure 2A:
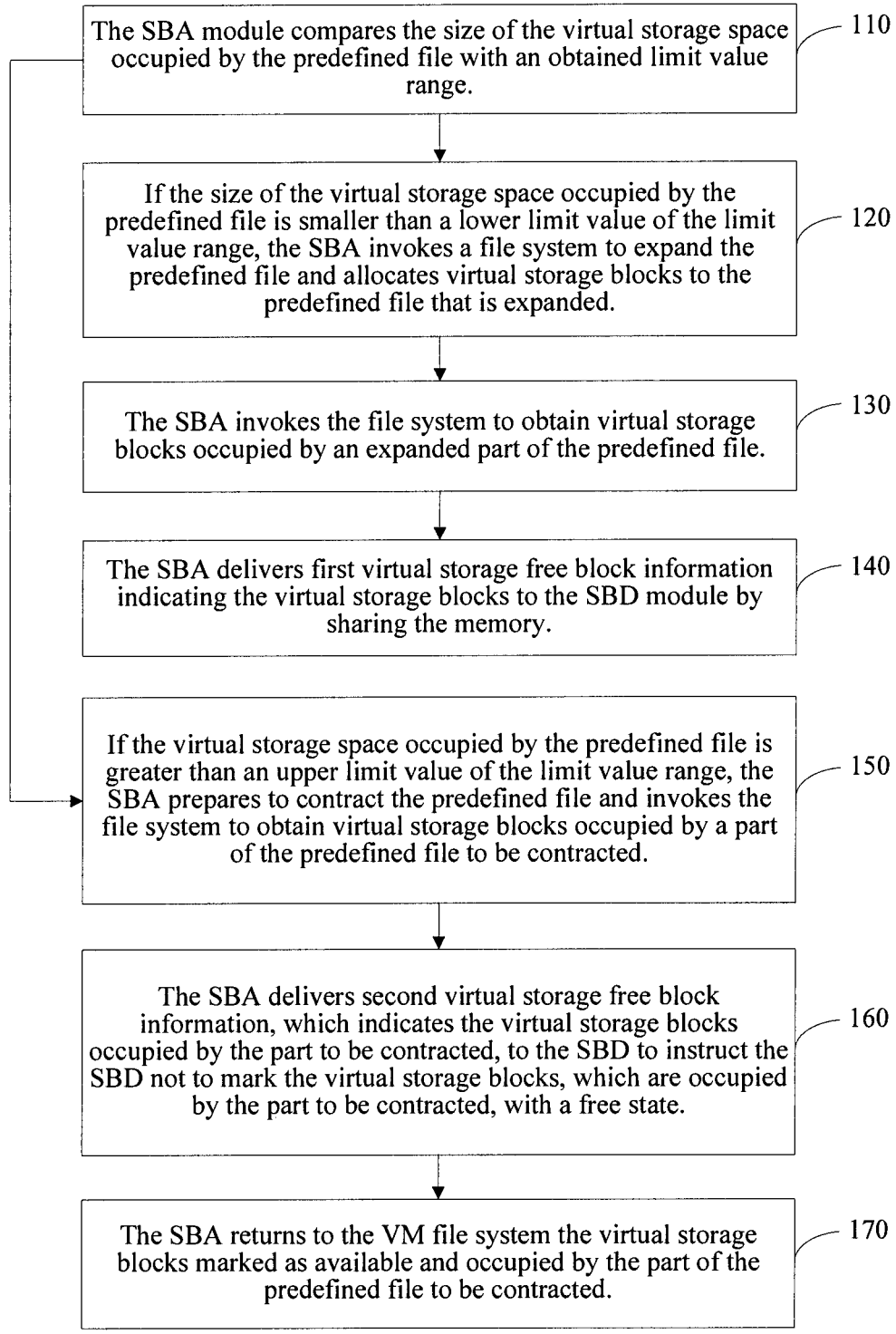
FIG. 2a is a schematic flow chart of specific steps of step 100 in the method shown in FIG. 2.

Referring to FIG. 2a, in a preferred solution, step 100 may specifically include the following steps.

110: The SBA deployed in the VM compares the size of the virtual storage space occupied by the predefined file with an obtained limit value range.

For different results obtained by comparing the size of the virtual storage space occupied by the predefined file with the limit value range, different operations are performed. The limit value range may be a preset fixed value or may be obtained through a specified algorithm according to other acquired parameters. In an implementation manner, step 110 may specifically include the following steps.

111: The SBA invokes a file system to acquire a size of virtual storage free space and the size of the virtual storage space occupied by the predefined file and obtains from the SBD module a lower limit proportion and an upper limit proportion, where the predefined file is allowed to occupy the virtual storage free space between the lower limit proportion and the upper limit proportion.

The VM acquires virtual storage free space information through an interface of the file system. This step is performed repeatedly according to a certain period. For example, this step may be performed at an interval of 1 to 5 seconds.

The lower limit proportion and the upper limit proportion are preset in the SBD module, where the predefined file is allowed to occupy the virtual storage free space between the lower limit proportion and the upper limit proportion. The upper limit proportion is preferably 80% to 90%, and the lower limit proportion is preferably 60% to 70%.

112: The SBA takes a product of the lower limit proportion and the size of the virtual storage free space and a product of the upper limit proportion and the size of the virtual storage free space as a lower limit value and an upper limit value of the preset limit value range respectively.

If it is assumed that the size of the virtual storage free space is X, the lower limit proportion is L1%, and the upper limit proportion is L2%, the lower limit value of the limit value range is X*L1%, and the upper limit value of the limit value range is X*L2%.

113: The VM compares the size of the virtual storage space occupied by the predefined file with the lower limit value and the upper limit value of the limit value range respectively.

If it is assumed that the size of the virtual storage space occupied by the predefined file is S, then S and X*L1%, and S and X*L2% are compared respectively.

120: If the size of the virtual storage space occupied by the predefined file is smaller than the lower limit value of the limit value range, the SBA invokes the file system to expand the predefined file and allocates virtual storage blocks to the predefined file that is expanded.

If the predefined file is smaller than the lower limit value, it indicates that the virtual storage free space is too large. In this case, it is necessary to release a part of free space. For the purpose of releasing the part of the free space, the predefined file first needs to be expanded to increase the free space occupied by the predefined file, so as to release free space occupied by an expanded part of the predefined file. In an implementation manner, step 120 may specifically include the following steps.

121: The SBA invokes a pre-allocated (fallocate) interface of the file system and imports an intermediate value of the limit value range as a size of the predefined file that is expanded. The intermediate value is equal to a half of a sum of the lower limit value and the upper limit value.

When the lower limit value is X*L1% and the upper limit value is X*L2%, the intermediate value is X*(L1%+L2%)/2.

122: A VM file system of the SBA allocates the virtual storage blocks to the predefined file that is expanded.

For example, virtual storage blocks [b1, b2, . . . , bn] may be allocated to the predefined file having a size of X*(L1%+L2%)/2.

123: The SBA invokes a lock interface of the file system to lock the virtual storage blocks allocated to the predefined file that is expanded, so as not to be modified by a storage device defragmentation tool.

130: The SBA invokes the file system to obtain virtual storage blocks occupied by the expanded part of the predefined file.

For the expanded part, that is, an interval [S, X*(L1%+L2%)/2], of the predefined file, the VM invokes a "file offset→data block" mapping (bmap) interface of the file system to obtain the occupied virtual storage blocks [bs, . . . , bn].

140: The SBA delivers first virtual storage free block information indicating the virtual storage blocks to the SBD module by sharing the memory.

The first virtual storage free block information is delivered to the SBD module, and physical storage space corresponding to the first virtual storage free block information is a candidate for reclamation and release. The first virtual storage free block information is delivered by sharing the memory, which is simple and reliable.

Figure 2B:
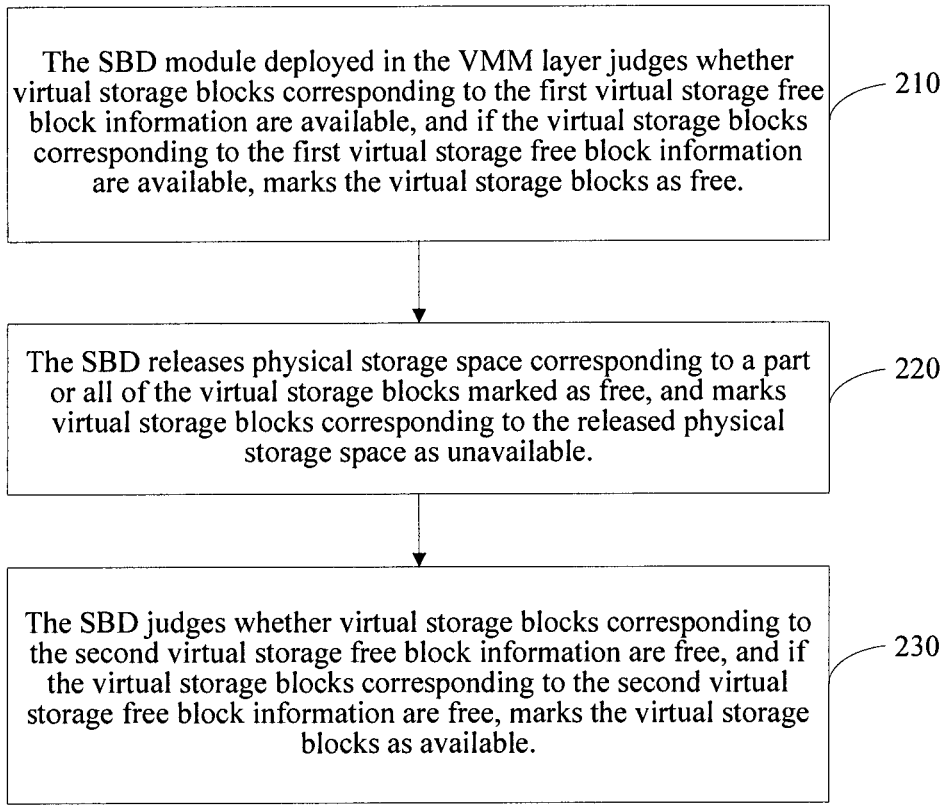
FIG. 2b is a schematic flow chart of specific steps of step 200 in the method shown in FIG. 2.

Referring to FIG. 2b, in an implementation manner, step 200 may specifically include the following steps.

210: The SBD deployed in the VMM layer judges whether virtual storage blocks corresponding to the first virtual storage free block information are available, and if the virtual storage blocks corresponding to the first virtual storage free block information are available, the virtual storage blocks are marked as free.

The SBD acquires the first virtual storage free block information by sharing the memory, judges whether the virtual storage blocks corresponding to the first virtual storage free block information are available, and if the virtual storage blocks corresponding to the first virtual storage free block information are available, the virtual storage blocks are marked as free; if the virtual storage blocks corresponding to the first virtual storage free block information are unavailable, no processing is performed. After the processing is completed, the SBD replies to the SBA.

220: The SBD releases physical storage space corresponding to a part or all of the virtual storage blocks marked as free, and marks virtual storage blocks corresponding to the released physical storage space as unavailable.

In this step, the SBD performs the operation of releasing a free block. According to the preset policy, the SBD may release the physical storage space corresponding to a part or all of the virtual storage blocks marked as free, and marks the virtual storage blocks corresponding to the released physical storage space as unavailable.

In actual execution, for the sake of simplicity, a simple policy may be executed, that is, for a virtual storage block marked as free, physical storage space corresponding to the virtual storage block is completely released, and a virtual storage block corresponding to the released physical storage space is marked as unavailable.

For the purpose of raising virtual storage management level, a preferred policy may also be executed, that is, when a frequency of an operation of allocating and/or releasing the storage space in the VM is equal to or greater than a threshold (here, the threshold may be preset or may be obtained through dynamic calculation), the SBD reduces a proportion of the released free blocks, and when the frequency of the operation of allocating and/or releasing the storage space in the VM is low, the SBD increases the proportion of the released free blocks. Specifically, the SBD judges whether the frequency of the operation of allocating or releasing the storage space in the VM is equal to or greater than a preset threshold, and if the frequency of the operation of allocating or releasing the storage space in the VM is not equal to or greater than the preset threshold, the SBD releases, in a preset proportion, the physical storage space corresponding to the virtual storage block marked as free, for example, releases the physical storage space in a preset proportion 80%; if the frequency of the operation of allocating or releasing the storage space in the VM is equal to or greater than the preset threshold, the SBD reduces the preset proportion at a preset rate, and releases, in the reduced proportion, the physical storage space corresponding to the virtual storage block marked as free. For example, the preset proportion 80% is reduced at a rate of 1% per second, and the physical storage space is released in the reduced proportion, for example, 75% or 70%. The proportion of the released free blocks is reduced since the free blocks are probably be used again in a short time, so as to reduce the overhead caused by frequent release and re-allocation. Definitely, when the frequency of the operation of allocating and releasing the storage space in the VM is low, the proportion of the released free blocks may be appropriately increased. If the storage space corresponding to the free block is a file, the function of releasing a free data block depends on exporting of an internal interface (free_blocks (start_block, count)) of a host file system. If the storage space corresponding to the virtual storage block is a block device, a lower-layer data block storage system is instructed to release the free block when the free block is released.

Referring to FIG. 2a, in the method according to the embodiment of the present invention, after step 110, that is, the SBA compares the size of the virtual storage space occupied by the predefined file with the obtained limit value range, the method may further include the following steps.

150: If the virtual storage space occupied by the predefined file is larger than the upper limit value of the limit value range, invoke the file system to obtain virtual storage blocks occupied by a part of the predefined file to be contracted.

If the predefined file is larger than the upper limit value, it indicates that the virtual storage free space is too small. In this case, it is necessary to return a part of free space occupied by the predefined file to the VM file system. For the purpose of returning the part of the free space, the predefined file needs to be contracted to decrease the free space occupied by the predefined file, so as to release free space occupied by the contracted part.

The SBA acquires a target value as a size of the predefined file that is contracted. A part larger than the target value is a part to be contracted and will be truncated and removed. In an implementation manner, the intermediate value of the limit value range is taken as the target size for the contraction of the predefined file. When an original size of the predefined file is S and the intermediate value is X*(L1%+L2%)/2, the part of the predefined file to be contracted is an interval [X*(L1%+L2%)/2, S]. For the interval, the VM invokes the "file offset→data block" mapping (bmap) interface of the file system to obtain the corresponding virtual storage blocks.

160: The SBA delivers second virtual storage free block information indicating the virtual storage blocks occupied by the part to be contracted to the SBD to instruct the SBD not to mark the virtual storage blocks, which are occupied by the part to be contracted, with a free state.

If the virtual storage blocks occupied by the part to be contracted are marked with the free state, the virtual storage blocks occupied by the part to be contracted are released by the SBD and cannot be returned to the VM file system, so it is necessary to notify the SBD in time so as to ensure that the virtual storage blocks occupied by the part to be contracted are not marked as free. In an implementation manner, the second virtual storage free block information is delivered by sharing the memory, which is simple and reliable.

After the SBD receives the second virtual storage free block information delivered by the SBA, step 230 is performed. 230: The SBD judges whether virtual storage blocks corresponding to the second virtual storage free block information is free, and if the virtual storage blocks corresponding to the second virtual storage free block information are free, the virtual storage blocks are marked as available.

The SBD acquires the second virtual storage free block information by sharing the memory, judges whether the virtual storage blocks corresponding to the second virtual storage free block information are free, and if the virtual storage blocks corresponding to the second virtual storage free block information are free, the virtual storage blocks are marked as available; if the virtual storage blocks corresponding to the second virtual storage free block information are unavailable, no processing is performed. Data block allocation in the VM may be only performed in a virtual layer, and actual data block allocation in the physical storage space is performed during the write operation. After the processing is completed, the SBD replies to the SBA.

170: The SBA invokes the file system to contract the predefined file.

The SBA invokes a truncate interface of the file system to import the intermediate value of the preset limit value range as a size of the predefined file that is contracted. The intermediate value is equal to a half of a sum of the lower limit value and the upper limit value.

The virtual storage blocks that are occupied by the part of the predefined file to be contracted (that is, a truncated part) and marked as available (that is, the virtual storage blocks corresponding to the second virtual storage free block information) are returned to the VM file system.

In the preferred solution of the method, a situation that the virtual storage space occupied by the predefined file is smaller than the lower limit value of the limit value range and a situation that the virtual storage space occupied by the predefined file is larger than the upper limit value of the limit value range are processed respectively.

When the size of the predefined file is between the lower limit value and the upper limit value of the limit value range, it indicates that the size of the virtual storage free space is suitable, and no processing is performed.

The method for managing the VM storage space according to the embodiment of the present invention is cyclically performed according to a certain period. After step 110, that is, the SBA deployed in the VM compares the size of the virtual storage space occupied by the predefined file with the obtained limit value range, different operations are performed according to comparison results respectively. After the operations are performed, no matter whether the size of the predefined file and the obtained limit value range are changed, the procedure returns for a next cycling period.

In the method for managing the VM storage space according to the embodiment of the present invention, virtual storage free data block information is acquired in real time through the SBA in the VM, use condition of the VM storage space is actively informed to the host, and information of the free blocks to be released is delivered to the SBD deployed in the VMM layer (that is, the host), and the host releases and re-allocates the virtual storage free blocks through the SBD. It can be seen that, the host can acquire the use condition of the VM storage space in real time, so the real time characteristic is good.

Further, in the method for managing the VM storage space according to the embodiment of the present invention, a large number of read and write operations of the storage system are avoided, so the system overhead is low; and the interface of the file system is used to acquire the virtual storage free blocks, so that implementation details of the file system do not need to be learned, and the universality is good.

Moreover, the method for managing the VM storage space according to the embodiment of the present invention is applicable to both a dynamic allocation image format and a pre-allocation mirror format.

In the method for managing the VM storage space according to the embodiment of the present invention, the use condition of the VM storage space is identified (that is, valid data blocks and free data blocks in the VM storage system are identified) in real time, so that the physical storage space corresponding to the virtual storage free blocks can be released, so as to effectively manage the storage space, thereby increasing a utilization ratio of a lower-layer storage system. Moreover, the valid data blocks are identified, so that the efficiency of Input/Output (I/O)-intensive operations such as online storage migration, VM cloning, and image backing up can be effectively increased. It can be seen that, the solution for managing the VM storage space according to the embodiment of the present invention can be used for management of automatically thin-provisioned space of the storage system.

Figure 3:
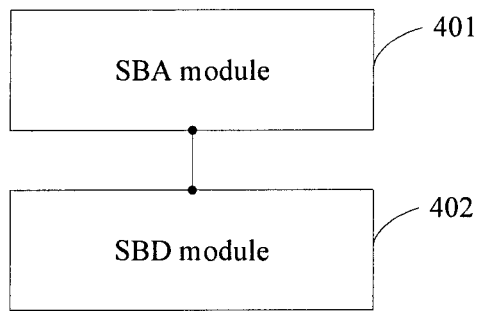
FIG. 3 is a diagram illustrating a logic structure of a system for managing VM storage space according to an embodiment of the present invention.

As shown in FIG. 3, an embodiment of the present invention provides a system for managing VM storage space, which includes an SBA module deployed in a VM and an SBD module deployed in a VMM layer. The system runs in a physical host.

Figure 4:
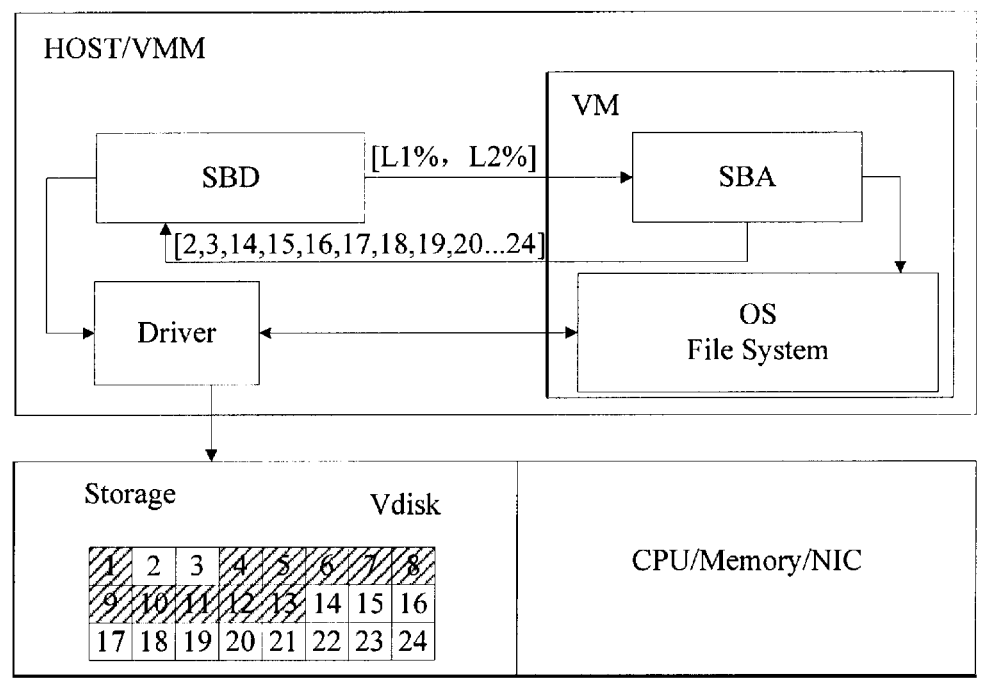
FIG. 4 is a schematic diagram illustrating a logic structure of a physical host according to an embodiment of the present invention.

In the following, a logic architecture of the physical host in which the system for managing the VM storage space runs is described first. As shown in FIG. 4, the physical host includes a hardware layer, a host, and a VM.

The hardware layer is a whole hardware platform on which virtual environment runs and may include a processor (for example, a Central Processing Unit (CPU)), a memory, a storage system (for example, a disk or a hard disk), a network interface card (NIC), an I/O device, and the like.

The host, that is, a VMM layer, as a management layer, completes management and allocation of hardware resources, presents a virtual hardware platform to the VM, and schedules and isolates VMs. During implementation of some VMMs, the cooperation of a privileged VM is required, and the privileged VM and the VMM are combined to form the host. The virtual hardware platform provides the VM thereon with various hardware resources, such as a Virtual CPU (VCPU), a virtual memory, a VDisk, and a virtual NIC. The VDisk corresponds to a file or a logic block device in the host. Successive blocks of the VDisk may be discretely stored in the host, so for convenience of organization and management, a VM disk image is generally described in an image format, where a metadata area is used to store a mapping relation between a VDisk data block and a data block in the host.

The VM runs in a virtual platform prepared by the host. At most time, execution of the VM is not affected by the host.

In the following, an SBA module and an SBD module are described. The SBA is deployed in the VM, and the SBD is deployed in the VMM layer.

An SBA module 401 is configured to acquire a part of occupied virtual storage blocks according to a size of virtual storage space occupied by a predefined file, and deliver virtual storage free block information corresponding to the virtual storage blocks to an SBD module.

An SBD module 402 is configured to release a part or all of physical storage space corresponding to the virtual storage free block information, and mark virtual storage blocks corresponding to the released physical storage space as unavailable.

In an implementation manner, the SBA module 401 may specifically include:

A comparison unit, which is configured to compare the size of the virtual storage space occupied by the predefined file with an obtained limit value range.

An expansion unit, which is configured to, if the virtual storage space occupied by the predefined file is smaller than a lower limit value of the limit value range, invoke a file system to expand the predefined file and allocate data blocks to the predefined file that is expanded.

An acquisition unit, which is configured to invoke the file system to acquire virtual storage blocks occupied by an expanded part of the predefined file.

A delivery unit, which is configured to deliver first virtual storage free block information indicating the virtual storage blocks to the SBD module.

In an implementation manner, the SBD module 402 may specifically include:

A judging unit, which is configured to judge whether virtual storage blocks corresponding to the first virtual storage free block information are available, and if the virtual storage blocks corresponding to the first virtual storage free block information are available, mark the virtual storage blocks as free.

A releasing and marking unit, which is configured to release physical storage space corresponding to a part or all of the virtual storage blocks marked as free and mark virtual storage blocks corresponding to the released physical storage space as unavailable according to a policy.

In the system for managing the VM storage space according to the embodiment of the present invention, virtual storage free data block information is acquired in real time through the SBA in the VM, use condition of the VM storage space is actively informed to the host, and information of the free blocks to be released is delivered to the SBD deployed in the VMM layer (that is, the host), and the host releases and re-allocates the virtual storage free blocks through the SBD. It can be seen that, the host can acquire the use condition of the VM storage space in real time, so the real time characteristic is good.

Further, in the system for managing the VM storage space according to the embodiment of the present invention, a large number of read and write operations of the storage system are avoided, so that the system overhead is low; and an interface of the file system is used to acquire the virtual storage free blocks, so that implementation details of the file system do not need to be learned, and the universality is good.

Moreover, the system for managing the VM storage space according to the embodiment of the present invention is applicable to both a dynamic allocation image format and a pre-allocation mirror format.

In the system for managing the VM storage space according to the embodiment of the present invention, the use condition of the VM storage space is identified (that is, valid data blocks and free data blocks in the VM storage system are identified) in real time, so that the physical storage space corresponding to the virtual storage free blocks can be released, so as to effectively manage the storage space, thereby increasing a utilization ratio of a lower-layer storage system. Moreover, the valid data blocks are identified, so that the efficiency of I/O-intensive operations such as online storage migration, VM cloning, and image backing up can be effectively increased. It can be seen that, the solution for managing the VM storage space according to the embodiment of the present invention can be used for management of automatically thin-provisioned space of the storage system.

As shown in FIG. 4, an embodiment of the present invention further provides a physical host, which includes a hardware layer, a VMM layer running on the hardware layer, and at least one VM running on the VMM layer, where an SBA is deployed in the VM, and an SBD is deployed in the VMM layer.

The SBA module is configured to acquire a part of occupied virtual storage blocks according to a size of virtual storage space occupied by a predefined file, and deliver virtual storage free block information corresponding to the part of the virtual storage blocks to the SBD module.

The SBD module is configured to release a part or all of physical storage space corresponding to the virtual storage free block information, and mark virtual storage blocks corresponding to the released physical storage space as unavailable.

In an implementation manner, the SBA module is specifically configured to: compare the size of the virtual storage space occupied by the predefined file with an obtained limit value range; if the virtual storage space occupied by the predefined file is smaller than a lower limit value of the limit value range, invoke a file system to expand the predefined file and allocate a virtual storage block to the predefined file that is expanded; invoke the file system to obtain virtual storage blocks occupied by an expanded part of the predefined file; and deliver first virtual storage free block information indicating the virtual storage blocks to the SBD module.

The SBD module is specifically configured to: judge whether virtual storage blocks corresponding to the first virtual storage free block information are available, and if the virtual storage blocks corresponding to the first virtual storage free block information are available, mark the virtual storage blocks as free; and according to a policy, release physical storage space corresponding to a part or all of the virtual storage blocks marked as free and mark virtual storage blocks corresponding to the released physical storage space as unavailable.

In an implementation manner, the SBA module is further configured to: if the virtual storage space occupied by the predefined file is larger than an upper limit value of the limit value range, invoke the file system to obtain virtual storage blocks occupied by a part of the predefined file to be contracted; deliver second virtual storage free block information indicating the virtual storage blocks to the SBD module; and invoke the file system to contract the predefined file.

The SBD module is further configured to: judge whether virtual storage blocks corresponding to the second virtual storage free block information are free, and if the virtual storage blocks corresponding to the second virtual storage free block information are free, mark the virtual storage blocks as available.

In the physical host according to the embodiment of the present invention, virtual storage free data block information is acquired in real time through the SBA in the VM, use condition of the VM storage space is actively informed to a host, and information of the free blocks to be released is delivered to the SBD deployed in the VMM layer (that is, the host), and the host releases and re-allocates the virtual storage free blocks through the SBD. It can be seen that, the host can acquire the use condition of the VM storage space in real time, so the real time characteristic is good.

Further, in the physical host according to the embodiment of the present invention, a large number of read and write operations of the storage system are avoided, so that the system overhead is low; and an interface of the file system is used to acquire the virtual storage free blocks, so that implementation details of the file system do not need to be learned, and the universality is good.

Moreover, the physical host according to the embodiment of the present invention is applicable to both a dynamic allocation image format and a pre-allocation mirror format.

In the physical host according to the embodiment of the present invention, the use condition of the VM storage space is identified (that is, valid data blocks and free data blocks in the VM storage system are identified) in real time, so that the physical storage space corresponding to the virtual storage free blocks can be released, so as to effectively manage the storage space, thereby increasing a utilization ratio of a lower-layer storage system. Moreover, the valid data blocks are identified, so that the efficiency of I/O-intensive operations such as online storage migration, VM cloning, and image backing up can be effectively increased. It can be seen that, the solution for managing the VM storage space according to the embodiment of the present invention can be used for management of automatically thin-provisioned space of the storage system.

For convenience of understanding, the method for managing the VM storage space described in the foregoing embodiment is described in detail in a specific application scenario. For the sake of clarity, steps performed by an SBA are described separately from steps performed by an SBD. In this embodiment, a lower-layer storage system being a disk is taken as an example for description. Accordingly, physical storage space is physical disk space, and virtual storage space is VDisk space.

Figure 5A:
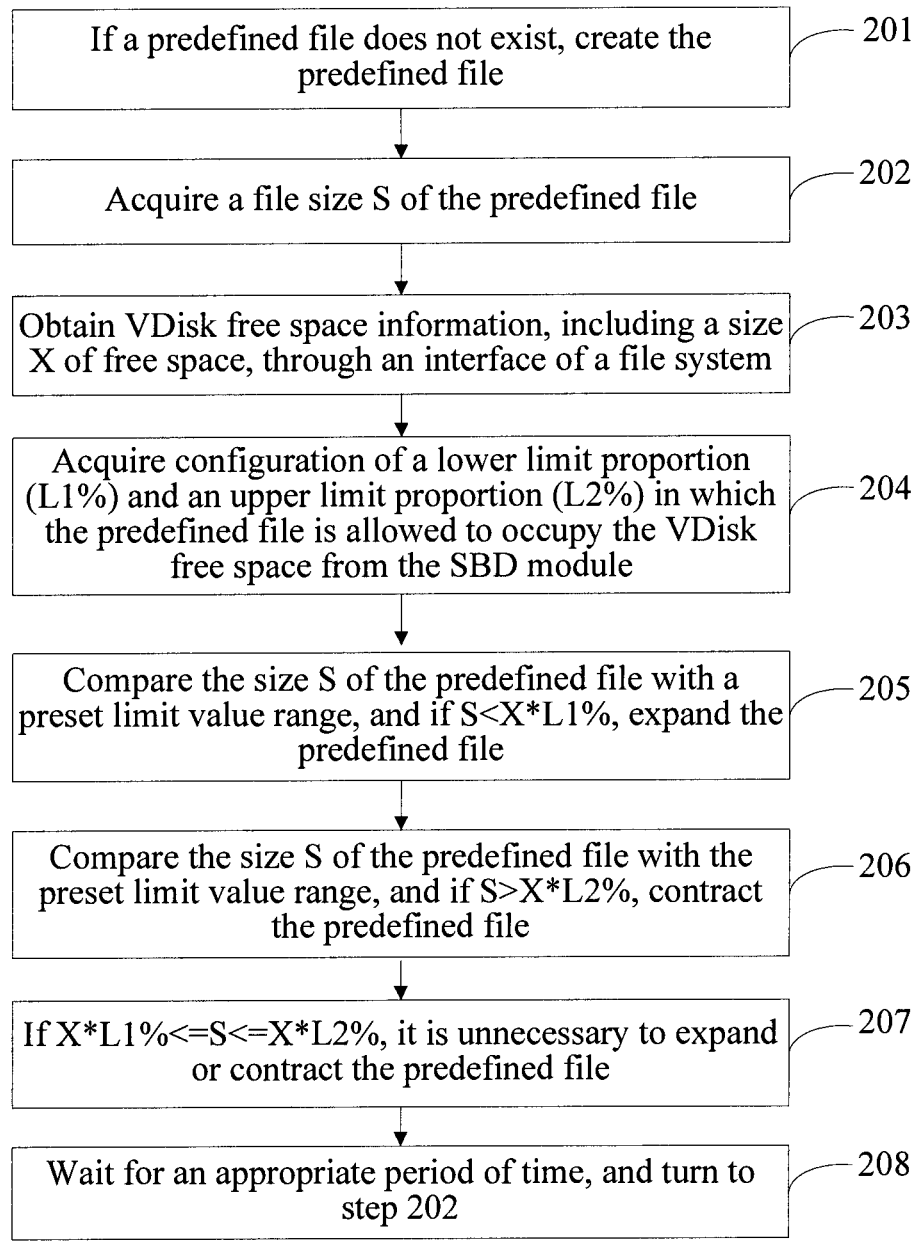
FIG. 5a is a schematic flow chart of a method for managing VM storage space in an application scenario according to an embodiment of the present invention.

As shown in FIG. 5*a*, steps performed by the SBA are described first in the following.

201: If a predefined file (F, for drive C of Windows, the predefined file may be C:\balloon.sys) does not exist, create the predefined file.

202: Acquire a file size S of the predefined file F.

203: Obtain VDisk free space information, including a size X of free space, through an interface of a file system.

204: Acquire configuration of a lower limit proportion (L1%) and an upper limit proportion (L2%) in which the F is allowed to occupy the VDisk free space from the SBD, as shown in FIG. 4.

205: Compare the size S of the predefined file with a preset limit value range, and if S<X*L1%, it indicates that the free space occupied by the predefined file F is too small, expand the predefined file.

2011: Invoke a pre-allocated (fallocate) interface of the file system and import X*(L1%+L2%)/2 as the size of the predefined file F, where the file system allocates data blocks [b1, b2, . . . , bn] to the file.

2022: Invoke a lock interface of the file system to ensure that VDisk data blocks corresponding to the predefined file F are not modified by a disk defragmentation tool.

2023: For an expanded part, that is, an interval [S, X*(L1%+L2%)/2], of the predefined file, invoke a "file offset→data block" mapping (bmap) interface of the file system to obtain a corresponding VDisk block group.

2024: Deliver first VDisk free block information corresponding to the VDisk block group to the SBD by sharing a memory, where the VDisk block group is used as a candidate for reclamation and release, and as shown in FIG. 4, the first VDisk free block information is, for example, [2, 3, 14, 15, 16, 17, 18, 19, 20, . . . , 24], and at the same time, deliver an expansion message to the SBD to instruct the SBD to perform a corresponding operation.

206: If S>X*L2%, it indicates that the free space occupied by the predefined file F is too large, contract the predefined file.

2061: The system takes X*(L1%+L2%)/2 as a size of the contracted F, so for the interval [X*(L1%+L2%)/2, S], invoke the "file offset→data block" mapping (bmap) interface of the file system to obtain a corresponding VDisk block group.

2062: Deliver second VDisk free block information corresponding to the VDisk block group to the SBD by sharing the memory, and at the same time, deliver a contraction message to the SBD to instruct the SBD to perform a corresponding operation and ensure that the VDisk block group is not marked by the SBD with a free state.

2063: Invoke a truncate interface of the file system to import X*(L1%+L2%)/2 as the size of the contracted F and return the VDisk block group to the VM file system.

207: If X*L1%<=S<=X*L2%, it indicates that the free space occupied by the predefined file F is suitable, and it is unnecessary to expand or contract the predefined file.

208: Wait for an appropriate period of time, and turn to step 202.

When the size of the predefined file F is limited by the file system, multiple predefined files F may need to be created.

Figure 5B:
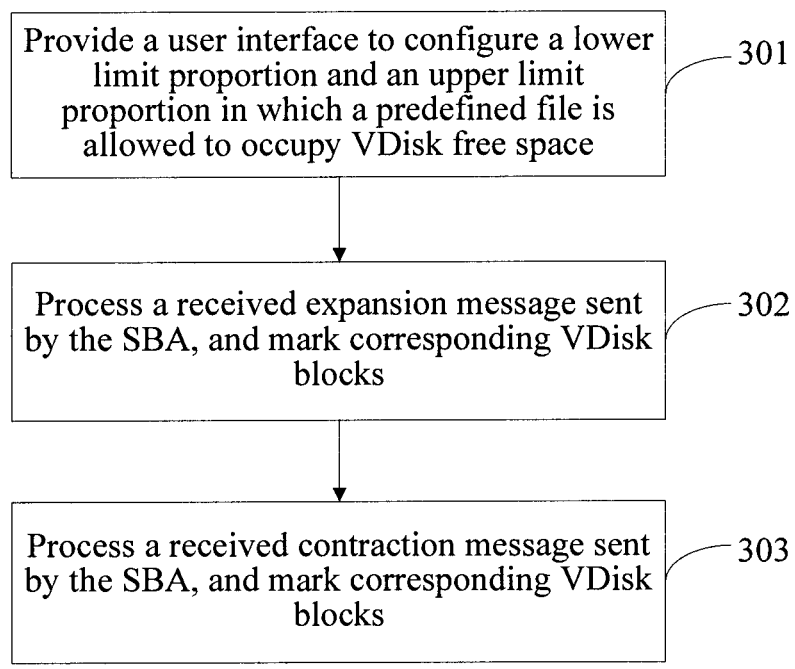
FIG. 5b is a schematic flow chart of a method for managing the VM storage space in an application scenario according to an embodiment of the present invention.

As shown in FIG. 5b, steps performed by the SBD are described in the following.

301: Provide a user interface to configure a lower limit proportion and an upper limit proportion in which the SBA allows a predefined file to occupy VDisk free space. The upper limit proportion and the lower limit proportion may be set flexibly. For example, during online storage migration, the proportion is appropriately increased to achieve the purpose of further reducing the copy of the VDisk free space. Generally, the lower limit proportion may be set to about 60%, and the upper limit proportion may be set to between 80% and 90%.

302: Process the received expansion message sent by the SBA. In this step, the SBD acquires first VDisk free block information, which is corresponding to the VDisk blocks to be released, by sharing a memory and marks the corresponding VDisk blocks. This step specifically includes the following steps.

3031: Judge whether VDisk blocks corresponding to the first VDisk free block information are available, and if the VDisk blocks corresponding to the first VDisk free block information are available, mark the VDisk blocks as free; if the VDisk blocks corresponding to the first VDisk free block information are unavailable, do not perform processing.

3032: After the judging and marking are completed, reply to the SBA.

3033: Release disk space corresponding to a part or all of free blocks and mark the corresponding blocks as unavailable according to a policy.

A simple policy is: release all blocks marked as free and marking the blocks as unavailable.

A preferred policy is as follows. When a frequency of an operation of allocating and releasing the disk space in a VM is equal to or greater than a certain threshold, the SBD reduces a proportion of released free data blocks since the free data blocks are probably be used again in a short time, so as to reduce the overhead caused by frequent release and re-allocation, and when the frequency of the operation of allocating and releasing the disk space in the VM is low, the SBD increases the proportion of released free data blocks.

When the data block is in the form of a file, the function of releasing the free blocks depends on exporting of an internal interface (free_blocks (start_block, count)) of a host file system, and when the data block is in the form of a block interface, a lower-layer block storage system is instructed to release the free blocks.

303: Process the received contraction message sent by the SBA. In this step, the SBD acquires second VDisk free block information, which is corresponding to VDisk blocks to be reclaimed, by sharing a memory and marks the corresponding VDisk blocks. This step specifically includes the following steps.

3031: Judge whether the corresponding VDisk blocks in a VDisk format are free, and if the corresponding VDisk blocks in the VDisk format are free, mark the corresponding VDisk blocks as available.

3032: Judge whether the corresponding VDisk blocks in the VDisk format are unavailable, and if the corresponding VDisk blocks in the VDisk format are unavailable, do not perform processing. Actual data block allocation may be performed during a write operation.

3033: Reply to the SBA.

In the solution for managing the VM storage space according to the embodiment of the present invention, virtual storage free data block information is acquired in real time through the SBA in the VM, use condition of the VM storage space is actively informed to a host, and information of the free blocks to be released is delivered to the SBD deployed in the VMM layer (that is, the host), and the host releases and re-allocates the virtual storage free blocks through the SBD. It can be seen that, the host can acquire the use condition of the VM storage space in real time, so the real time characteristic is good.

Further, in the solution for managing the VM storage space according to the embodiment of the present invention, a large number of read and write operations of the storage system are avoided, so that the system overhead is low; and the interface of the file system is used to acquire the virtual storage free blocks, so that implementation details of the file system do not need to be learned, and the universality is good.

Moreover, the solution for managing the VM storage space according to the embodiment of the present invention is applicable to both a dynamic allocation image format and a pre-allocation mirror format.

In the solution for managing the VM storage space according to the embodiment of the present invention, the use condition of the VM storage space is identified (that is, valid data blocks and free data blocks in a VM storage system are identified) in real time, so that the physical storage space corresponding to the virtual storage free blocks can be released, so as to effectively manage the storage space, thereby increasing a utilization ratio of a lower-layer storage system. Moreover, the valid data blocks are identified, so that the efficiency of I/O-intensive operations such as online storage migration, VM cloning, and image backing up can be effectively increased. It can be seen that, the solution for managing the VM storage space according to the embodiment of the present invention can be used for management of automatically thin-provisioned space of the storage system.

Persons of ordinary skill in the art should understand that all or a part of the steps of the method according to the embodiments of the present invention may be implemented by a program instructing relevant hardware. The program may be stored in a computer readable storage medium. The storage medium may include a read-only memory (ROM), a random access memory (RAM), a magnetic disk, or an optical disk.

The method and the system for managing the VM storage space and a computer terminal according to the embodiments of the present invention are described in detail in the foregoing. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for managing a Virtual Machine (VM) storage space, applicable to a physical host, wherein the physical host comprises a hardware layer, a Virtual Machine Monitor (VMM) layer running on the hardware layer, and a VM running on the VMM layer, wherein a Storage Balloon Agent (SBA) module is deployed in the VM, and a Storage Balloon Daemon (SBD) module is deployed in the VMM layer, the method comprising:

acquiring, by the SBA module, virtual storage blocks occupied by an expanded part of a predefined file or virtual storage blocks occupied by a contracted part of the predefined file according to results obtained by comparing a size of virtual storage space occupied by the predefined file and a limit value range indicating virtual storage free space which is allowed to be occupied by the predefined file, wherein the predefined file is used to occupy certain virtual storage free space, and delivering virtual storage free block information indicating the virtual storage blocks to the SBD module;

releasing, by the SBD module, a part or all of a physical storage space corresponding to the virtual storage free block information so that the released physical storage space can be re-allocated, and marking virtual storage blocks corresponding to the released physical storage space as unavailable in a VM storage format;

wherein acquiring, by the SBA module, the virtual storage blocks and delivering the virtual storage free block information to the SBD module comprises:

comparing, by the SBA module, the size of the virtual storage space occupied by the predefined file with the limit value range, wherein the limit value range includes a lower limit value and an upper limit value;

if the size of the virtual storage space occupied by the predefined file is smaller than the lower limit value of the limit value range, expanding the predefined file and allocating virtual storage blocks from virtual storage free space to the predefined file that is expanded;

obtaining first virtual storage blocks occupied by an expanded part of the predefined file; and delivering first virtual storage free block information indicating the first virtual storage blocks to the SBD module;

wherein releasing, by the SBD module, a part or all of the physical storage space corresponding to the virtual storage free block information, and marking the virtual storage blocks corresponding to the released physical storage space as unavailable in a VM storage format comprises:

judging, by the SBD module, whether the first virtual storage blocks corresponding to the first virtual storage free block information are available, and if the first virtual storage blocks corresponding to the first virtual storage free block information are available, marking the first virtual storage blocks as free; and releasing physical storage space corresponding to a part or all of the first virtual storage blocks marked as free and marking the first virtual storage blocks corresponding to the released physical storage space as unavailable in the VM format according to a policy;

wherein releasing the physical storage space corresponding to a part or all of the first virtual storage blocks marked as free according to the policy comprises:

judging whether a frequency of an operation of allocating or releasing the storage space in the VM is greater than a preset threshold, and if the frequency of the operation of allocating or releasing the storage space in the VM is not greater than the preset threshold, releasing, in a preset proportion, the physical storage space corresponding to the first virtual storage blocks marked as free; if the frequency of the operation of allocating or releasing the storage space in the VM is greater than the preset threshold, reducing the preset proportion at a preset rate, and releasing, in the reduced proportion, the physical storage space corresponding to the first virtual storage blocks marked as free.

2. The method according to claim 1, wherein after comparing, by the SBA module, the size of the virtual storage space occupied by the predefined file with the obtained limit value range, the method further comprises:

if the size of the virtual storage space occupied by the predefined file is larger than the upper limit value of the limit value range, obtaining virtual storage blocks occupied by the contracted part of the predefined file; and delivering second virtual storage free block information indicating the second virtual storage blocks to the SBD module.

3. The method according to claim 2, wherein after delivering the second virtual storage free block information indicating the second virtual storage blocks to the SBD module, the method further comprises:

judging, by the SBD module, whether the second virtual storage blocks corresponding to the second virtual storage free block information are free, and if the second virtual storage blocks corresponding to the second virtual storage free block information are free, marking the second virtual storage blocks as available; and contracting, by the SBA module, the predefined file.

4. The method according to claim 1, wherein comparing, by the SBA module, the size of the virtual storage space occupied by the predefined file with the obtained limit value range comprises:

invoking, by the SBA module, a file system to acquire the size of the virtual storage free space and the size of the virtual storage space occupied by the predefined file, and obtaining from the SBD module a lower limit proportion and an upper limit proportion preset in the SBD module, wherein the predefined file is allowed to occupy the virtual storage free space between the lower limit proportion and the upper limit proportion;

taking a product of the lower limit proportion and the size of the virtual storage free space as the lower limit value of the limit value range, and taking a product of the upper limit proportion and the size of the virtual storage free space as the upper limit value of the limit value range; and comparing the size of the virtual storage space occupied by the predefined file with the lower limit value and the upper limit value of the limit value range respectively so as to determine whether the size of the virtual storage space occupied by the predefined file is smaller than the lower limit value or larger than the upper limit value.

5. The method according to claim 1, wherein expanding the predefined file comprises:

invoking, by the SBA module, a pre-allocated (fallocate) interface of a file system and importing an intermediate value of the limit value range as a size of the predefined file that is expanded, wherein the intermediate value is equal to a half of a sum of the lower limit value and the upper limit value of the limit value range.

6. The method according to claim 3, wherein contracting the predefined file comprises:
invoking, by the SBA module, a truncate interface of a file system and importing an intermediate value of the limit value range as a size of the predefined file that is contracted, wherein the intermediate value is equal to a half of a sum of the lower limit value and the upper limit value of the limit value range; and
returning the second virtual storage blocks that are marked as available and are corresponding to a truncated part of the predefined file to the file system.

7. The method according to claim 1, wherein after expanding the predefined file, the method further comprises:
invoking, by the SBA module, a lock interface of a file system to lock the first virtual storage blocks allocated to the predefined file that is expanded.

8. The method according to claim 1, wherein delivering the virtual storage free block information to the SBD module comprises:
delivering, by the SBA module, the virtual storage free block information to the SBD module by sharing a memory.

9. A system for managing a Virtual Machine (VM) storage space, comprising a Storage Balloon Agent (SBA) module deployed in a VM and a Storage Balloon Daemon (SBD) module deployed in a Virtual Machine Monitor (VMM) layer, wherein
the SBA module is configured to acquire virtual storage blocks occupied by an expanded part of a predefined file or virtual storage blocks occupied by a contracted part of the predefined file according to results obtained by comparing a size of virtual storage space occupied by the predefined file and a limit value range indicating virtual storage free space which is allowed to be occupied by the predefined file, wherein the predefined file is used to occupy certain virtual storage free space, and deliver virtual storage free block information indicating the part of virtual storage blocks to the SBD module;
the SBD module is configured to release a part or all of a physical storage space corresponding to the virtual storage free block information so that the released physical storage space can be re-allocated, and mark virtual storage blocks corresponding to the released physical storage space as unavailable in a VM storage format;
wherein the SBA module is further configured to:
compare the size of the virtual storage space occupied by the predefined file with the limit value range, wherein the limit value range includes a lower limit value and an upper limit value;
if the size of the virtual storage space occupied by the predefined file is smaller than the lower limit value of the limit value range, expand the predefined file and allocating virtual storage blocks from virtual storage free space to the predefined file that is expanded;
obtain first virtual storage blocks occupied by an expanded part of the predefined file; and
deliver first virtual storage free block information indicating the first virtual storage blocks to the SBD module;
wherein the SBD module is further configured to:
judge whether the first virtual storage blocks corresponding to the first virtual storage free block information are available, and if the first virtual storage blocks corresponding to the first virtual storage free block information are available, mark the first virtual storage blocks as free; and
release physical storage space corresponding to a part or all of the first virtual storage blocks marked as free and mark the first virtual storage blocks corresponding to the released physical storage space as unavailable in the VM format according to a policy; and
judge whether a frequency of an operation of allocating or releasing the storage space in the VM is greater than a preset threshold, and if the frequency of the operation of allocating or releasing the storage space in the VM is not greater than the preset threshold, release, in a preset proportion, the physical storage space corresponding to the first virtual storage blocks marked as free; if the frequency of the operation of allocating or releasing the storage space in the VM is greater than the preset threshold, reduce the preset proportion at a preset rate, and release, in the reduced proportion, the physical storage space corresponding to the first virtual storage blocks marked as free.

10. A physical host, comprising a hardware layer, a Virtual Machine Monitor (VMM) layer running on the hardware layer, and at least one Virtual Machine (VM) running on the VMM layer, wherein a Storage Balloon Agent (SBA) module is deployed in the VM, and a Storage Balloon Daemon (SBD) module is deployed in the VMM layer, wherein
the SBA module is configured to acquire virtual storage blocks occupied by an expanded part of a predefined file or virtual storage occupied contracted part of the predefined file according to results obtained by comparing a size of virtual storage space occupied by the predefined file and a limit value range indicating virtual storage free space which is allowed to be occupied by the predefined file, wherein the predefined file is used to occupy certain virtual storage free space, and deliver virtual storage free block information indicating the part of virtual storage blocks to the SBD module;
the SBD module is configured to release a part or all of a physical storage space corresponding to the virtual storage free block information so that the released physical storage space can be re-allocated, and mark virtual storage blocks corresponding to the released physical storage space as unavailable in a VM storage format;
wherein the SBA module is further configured to:
compare the size of the virtual storage space occupied by the predefined file with the limit value range, wherein the limit value range includes a lower limit value and an upper limit value;
if the size of the virtual storage space occupied by the predefined file is smaller than the lower limit value of the limit value range, expand the predefined file and allocating virtual storage blocks from virtual storage free space to the predefined file that is expanded;
obtain first virtual storage blocks occupied by an expanded part of the predefined file; and
deliver first virtual storage free block information indicating the first virtual storage blocks to the SBD module;
wherein the SBD module is further configured to:
judge whether the first virtual storage blocks corresponding to the first virtual storage free block information are available, and if the first virtual storage blocks corresponding to the first virtual storage free block information are available, mark the first virtual storage blocks as free; and
release physical storage space corresponding to a part or all of the first virtual storage blocks marked as free and mark the first virtual storage blocks corresponding to the released physical storage space as unavailable in the VM format according to a policy; and judge whether a frequency of an operation of allocating or releasing the storage space in the VM is greater than a preset threshold, and if the frequency of the operation of allocating or releasing the storage space in the VM is not greater than the preset threshold, release, in a preset proportion, the physical storage space corresponding to the first virtual storage blocks marked as free; if the frequency of the operation of allocating or releasing the storage space in the VM is greater than the preset threshold, reduce the preset proportion at a preset rate, and release, in the reduced proportion, the physical storage space corresponding to the first virtual storage blocks marked as free.

11. The physical host according to claim 10, wherein:

the SBA module is further configured to:

if the size of the virtual storage space occupied by the predefined file is larger than an upper limit value of the limit value range, obtain second virtual storage blocks occupied by a contracted part of the predefined file;

deliver second virtual storage free block information indicating the second virtual storage blocks to the SBD module; and contract the predefined file; and the SBD module is further configured to:

judge whether the second virtual storage blocks corresponding to the second virtual storage free block information are free, and if the second virtual storage blocks corresponding to the second virtual storage free block information are free, mark the second virtual storage blocks as available.

12. The method according to claim 1, wherein:

expanding the predefined file comprises: invoking a file system; and obtaining the virtual storage blocks occupied by an expanded part of the predefined file comprises: invoking the file system.

* * * * *